Dec. 26, 1967     A. A. GUTHRIE     3,360,283

PIPE COUPLING

Filed July 30, 1965

INVENTOR.
ALFRED A. GUTHRIE

BY
*Dunlap & Laney*

ATTORNEYS

United States Patent Office 3,360,283
Patented Dec. 26, 1967

3,360,283
PIPE COUPLING
Alfred A. Guthrie, Tulsa, Okla., assignor, by mesne assignments, to Spiral Pipe Corporation, Oklahoma City, Okla., a corporation of Oklahoma
Filed July 30, 1965, Ser. No. 476,094
1 Claim. (Cl. 285—110)

ABSTRACT OF THE DISCLOSURE

A device for rapid joinder of lengths of pipe or conduit wherein the device is a unitary formation of elastic material of generally cylindrical shape, opposite ends of the cylinder being sized to fit securely within the inside diametric openings of the pipe or conduit to be joined, and the cylinder having a raised, circumferential ring which is centrally disposed to separate the cylindrical member into opposite side portions.

---

This invention relates generally to improvements in couplings for interconnecting adjacent joints of pipe used in a fluid circuit.

As it is well known in the art, a great variety of coupling construction have been used for joining the adjacent ends of adjacent joints of pipe. Generally speaking, however, prior couplings have either required the formation of grooves or threads in the inner or outer surfaces of the pipe, or such couplings have required the use of rigid material clamping means and separate seals to provide a fluid-tight connection of the pipe joints. In either event, the cost of the coupling or the cost of preparation of the pipe for the coupling has been unduly high and an inordinate length of time has been required to install the couplings.

Stated broadly, the present invention contemplates a coupling formed of an elastic material which efficiently interconnects a pair of joints of pipe without the necessity of providing threads or grooves in the pipe joints. The coupling comprises an annular elongated body of elastic material which is inserted in the adjacent ends of the pipe joints being interconnected. The outer diameter of the annular body is substantially equal to the inner diameter of the respective pipe joint to facilitate the insertion of the body into the pipe joint, but the body is provided with a plurality of external circumferential lips formed thereon which are distorted upon insertion of the body into a pipe joint and which frictionally engage the inner surface of the pipe joint to effectively retain the coupling in the desired position and provide an efficient seal between the pipe joints interconnected by the coupling.

The coupling of this invention is particularly useful in fluid circuits requiring frequent assembly and disassembly, such as agricultural irrigation circuits, as well as in fluid circuits wherein limited space is normally available for installation, such as in heating and air conditioning ducts.

An object of this invention is to provide a coupling for interconnecting adjacent joints of pipe wherein the joints can be interconnected in a minimum of time and with a minimum of effort.

Another object of this invention is to provide a pipe coupling which does not require the provision of grooves or threads in the pipe.

A further object of this invention is to provide a pipe coupling which does not require the use of bolts or other conventional fasteners.

A still further object of this invention is to provide a pipe coupling by means of a single piece of elastic material which may be readily molded into the desired configuration.

Another object of this invention is to provide a pipe coupling which is simple in construction, may be economically manufactured and which will have a long service life.

Other objects and advantages of the invention will be evident from the following detailed description when read in conjunction with the accompanying drawings which illustrate the invention.

Figure 1:
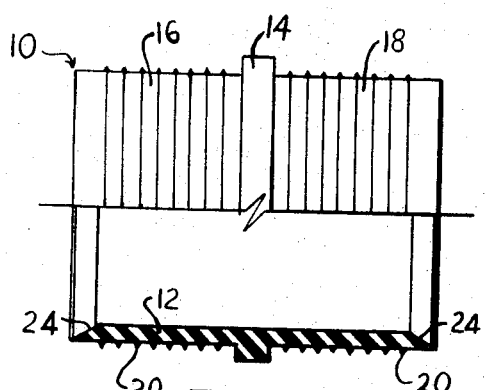
FIG. 1 is a side elevational view of a coupling constructed in accordance with this invention, with a quarter section of the coupling removed to more clearly illustrate the structure of the coupling.
Figure 2:
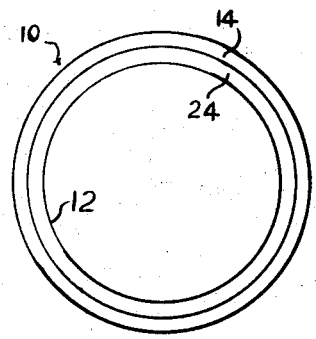
FIG. 2 is an end view of the coupling of FIG. 1.

Referring to the drawings in detail and particularly FIGS. 1 and 2, reference character 10 generally designates the coupling which comprises an elongated, annular body 12 of elastic material, such as natural or synthetic rubber. An external circumferential flange 14 is formed around the central portion of the body 12 and divides the body 12 into what may be considered a first end portion 16 and a second end portion 18. In the preferred form of the invention, the outer diameters of the end portions 16 and 18 are substantially equal and the lengths of the end portions 16 and 18 are substantially equal. Further, a plurality of external circumferential lips 20 are formed around each end portion 16 and 18 in spaced relation along the length of the respective end portion. The lips 20 have a radial thickness substantially less than the thickness of the body 12 and are relatively easily distorted into the body 12, as will be further described. For example, the radial thickness of each lip 20 may be $\frac{1}{32}$ inch and the total radial thickness of the body 12 may be one inch in a typical commercial form of the coupling.

Figure 3:
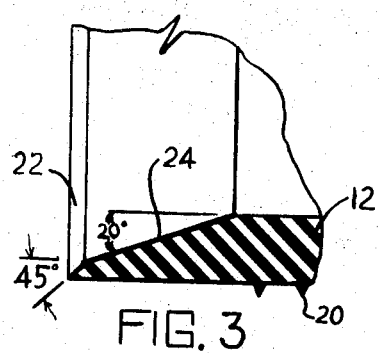
FIG. 3 is an enlarged detail cross-section view of a portion of one end of the coupling of FIG. 1 to more clearly illustrate the details of construction.

As shown most clearly in FIG. 3, the inner surface of the body 12 is tapered at each end of the coupling. The extreme end portion 22 is tapered at a substantial angle to the longitudinal axis of the coupling, such as at an angle of 45° as illustrated in FIG. 3. The remaining tapered portion 24 is then tapered at a smaller angle, such as at an angle of 20° to the longitudinal axis of the coupling. With this arrangement, fluid flowing through the coupling will impinge on the tapered portion 22 and minimize the tendency of the fluid to flow around the coupling, and yet the length of the tapered portion 22 is small with respect to the length of the tapered portion 24, whereby the coupling 12 will provide a minimum of turbulence in fluid flowing through the coupling. In this latter respect, it should be noted that the inner diameter of the coupling 12 between the tapered portions 24 is substantially uniform, as can best be seen in FIG. 1, to provide a relatively smooth inner surface for the coupling.

Figure 4:
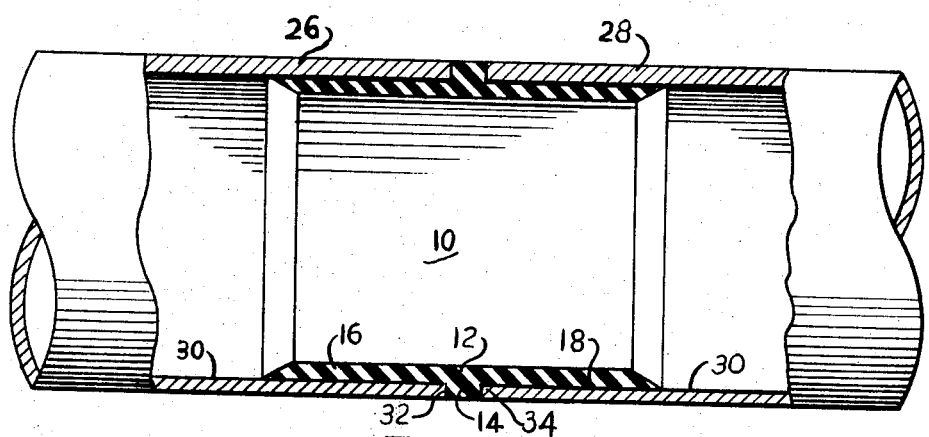
FIG. 4 is a vertical sectional view through the coupling of this invention shown in operating position interconnecting a pair of joints of pipe.

The use of the coupling 10 for interconnecting adjacent joints of pipe 26 and 28 is illustrated in FIG. 4. As will be observed in this figure, the inner surface 30 of each of the joints 26 and 28 is smooth, and it may also be noted that the pipe joints 26 and 28 will normally be of a substantially rigid, unyielding material, such as steel, aluminum or plastic. In this example of use, the end portion 16 of the body 12 is inserted in the end of the pipe joint 26 and the end portion 18 of the body 12 is inserted in the end of the pipe joint 28 until the end 32 of the joint 26 contacts one side of the circumferential flange 14 and the end 34 of the joint 28 contacts the opposite side of the flange 14.

In the preferred embodiment, the outer diameters of the joints 26 and 28 are substantially equal and the outer diameters of the flange 14 are substantially equal to the outer diameters of the joints 26 and 28 to provide a relatively smooth outer surface for the complete assembly which would be desirable, for example, if the joints 26 and 28 were to be wraped with insulating material (not shown). Also in the preferred form of the invention, the outer diameter of the coupling portion 16 substantially corresponds to the inner diameter of the pipe joints 26 and the outer diameter of the coupling portion 18 substantially corresponds to the inner diameter of the pipe joint 28. Thus, the coupling portions 16 and 18 may be easily inserted in the respective ends of the pipe joints 26 and 28 manually and without appreciably distorting the elastic material body 12. However, the lips 20 are sized to be distorted by the repsective pipe joints 26 and 28 when the coupling 10 is installed, whereby the lips 20 are distorted inwardly into the body 12. Since the lips 20 continually tend to regain their shape, they frictionally engage the respective inner surface of the respective pipe joint and effectively interconnect the coupling 10 with the pipe joints.

It should also be noted in FIG. 4 that since the outer diameters of the portions 16 and 18 of the coupling substantially correspond with the inner diameters of the respective pipe joints 26 and 28, fluid flowing through the pipe joints and the coupling will be effectively prevented from flowing around the outer surface of the portions 16 and 18 and leaking between the ends 32 and 34 of the pipe joints. As previously noted, the tapered configuration at the opposite ends of the coupling also minimizes the tendency of fluid to leak around the coupling, and yet the coupling will create a minimum of turbulence in fluid flowing therethrough.

From the foregoing it will be apparent that the present invention provides a coupling which does not require the provision of grooves or threads in the pipe being connected and provides the utmost in economy with respect to both the coupling and the pipe being connected. The coupling is easily installed manually without the use of any special tools, and pipe may be assembled and disassembled in a minimum of time. When assembled, the coupling provides an effective interconnection of adjacent joints of pipe and effectively prevents the leakage of fluid flowing through the pipes.

Changes may be made in the combination and arrangement of parts or elements as heretofore set forth in this specification and shown in the drawings without departing from the spirit and scope of the invention as defined by the following claim.

What is claimed is:

In combination with a pair of joints of pipe of substantially rigid, unyielding material having smooth internal surfaces, a coupling for securing the joints in end-to-end relation to form a portion of a fluid circuit, comprising an elongated annular body of elastic material having a first end portion thereof inserted in the end of one of the joints and the other end portion thereof inserted in the end of the other joint, said body having:

an external circumferential flange formed on the central portion thereof between said first and other end portions sized to be engaged by the ends of the joints when the end portions of the body are inserted in the ends of the joints;

an outer diameter throughout the length of said first end portion substantially corresponding to the inner diameter of said one joint;

an outer diameter throughout the length of said other end portion substantially corresponding to the inner diameter of said other joint;

an outward taper formed on the ends of said first and other end portions, said tapers being formed at an angle of about 45° to the longitudinal axis of the body for a relatively small outer portion of the length of the taper and then being formed at an angle of about 20° to the longitudinal axis of the body for the remaining portion of the length of the taper;

a constant inner diameter throughout the length of said body between said end tapers, said inner diameter substantially corresponding to the inner diameter of said body at the axially innermost ends of said tapers; and a plurality of external circumferential lips on each end portion sized to be distorted by the respective joint into said body and frictionally grip the inner surface of the respective joint.

References Cited

UNITED STATES PATENTS

| 2,403,364 | 7/1946 | Hertzell et al. | 285—370 X |
| 2,871,034 | 1/1959 | Wiltse | 285—109 |
| 3,016,722 | 1/1962 | Batdorf | 277—208 X |

FOREIGN PATENTS

| 164,920 | 9/1955 | Australia. |
| 697,134 | 9/1953 | Great Britain. |
| 615,708 | 1/1961 | Italy. |
| 78,014 | 5/1955 | Netherlands. |

CARL W. TOMLIN, *Primary Examiner.*

R. G. BERKLEY, *Assistant Examiner.*